April 18, 1933. L. D. SOUBIER 1,904,957
GLASS FURNACE
Filed May 24, 1929 2 Sheets-Sheet 1
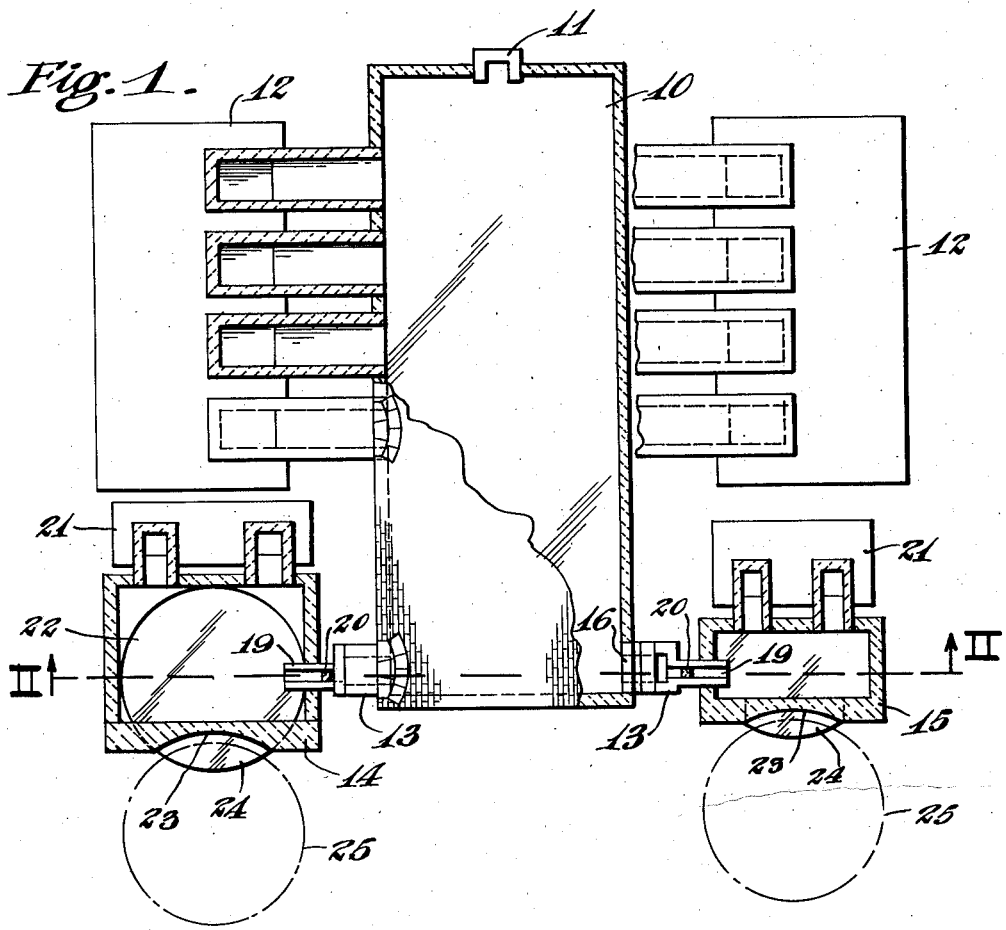
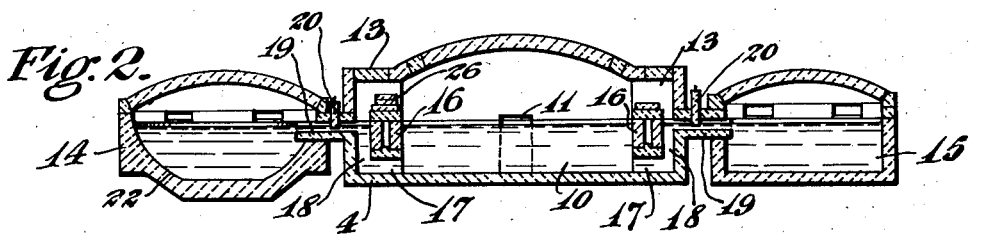
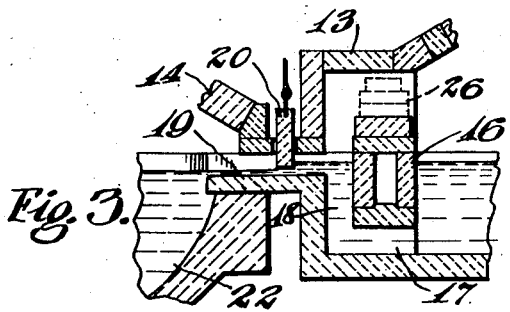
Inventor
Leonard D. Soubier
By J. F. Rule.
Attorney

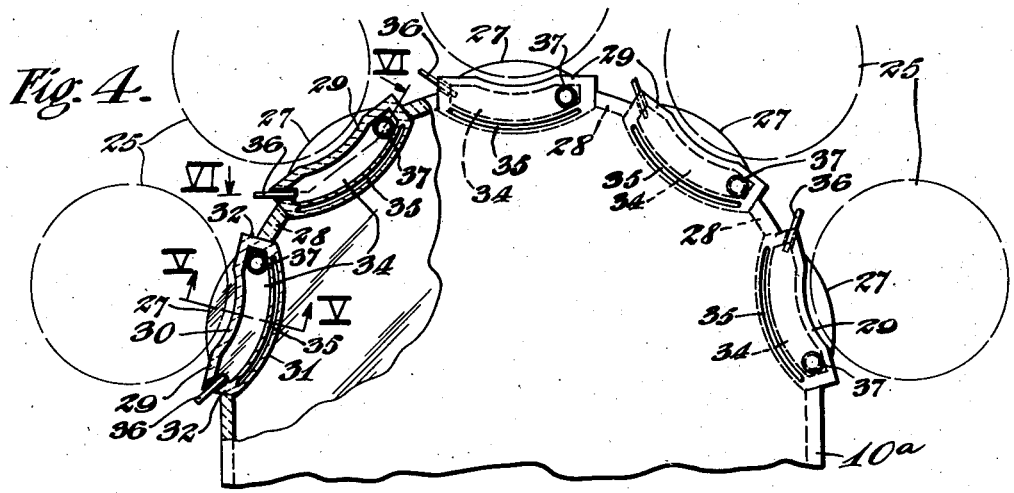
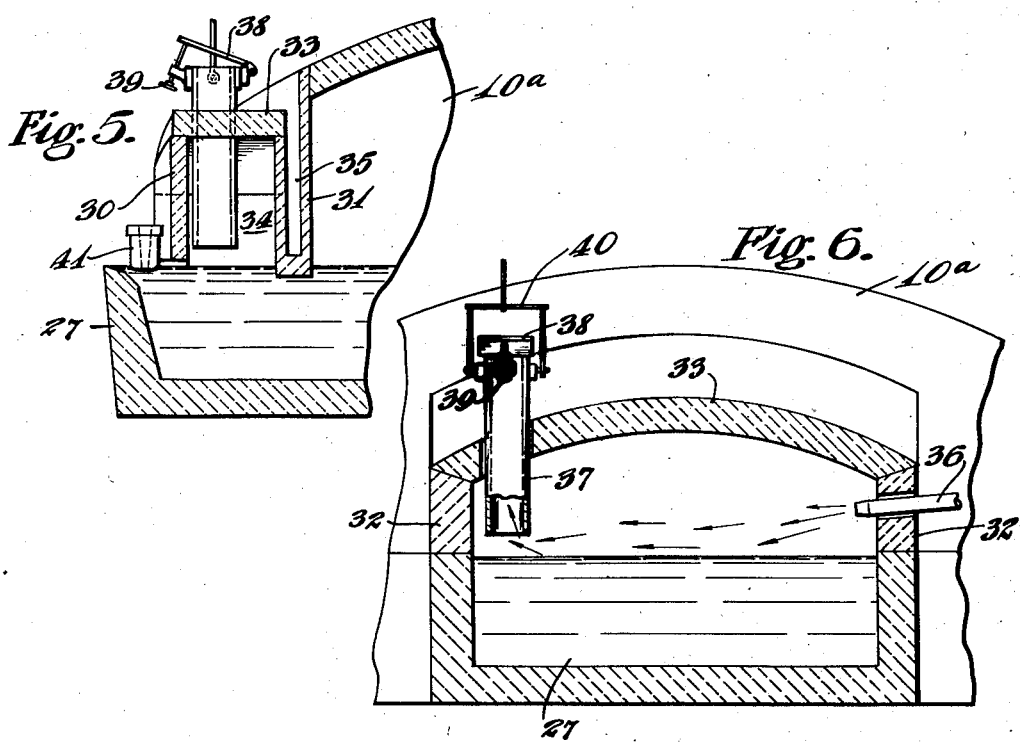

Patented Apr. 18, 1933

1,904,957

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FURNACE

Application filed May 24, 1929. Serial No. 365,627.

My invention relates to furnace constructions, and particularly to furnaces designed and adapted for supplying molten glass to machines of the rotary suction gathering type.

An object of the invention is to provide an efficient and practical furnace in which the usual refining tank or compartment is eliminated and at the same time adequate provision made both for refining the glass and for regulating and controlling the temperature of the glass at the gathering area.

Tank furnaces for supplying molten glass to machines which are automatically fed or supplied with glass for molding glass articles, etc., ordinarily comprise a melting compartment and a large refining compartment separated by a bridge wall. An important function of the refining compartment is to provide means for suitably regulating the temperature of the glass, the working temperature of glass fed to automatic machines being substantially lower than that to which the glass must be raised in the melting compartment for properly melting the batch. It has heretofore been proposed to eliminate the usual refining tank and cause the glass to flow directly from the melting tank into a forehearth or furnace extension from which the glass is discharged thru a bottom outlet and delivered to molds. In such arrangements, however, there has not been adequate or satisfactory provision for temperature control, nor any practical arrangement for supplying glass to suction gathering molds.

An object of the present invention is to provide a practical construction in which the above difficulties and objections are overcome and provision made for supplying glass to suction gathering molds.

In the accompanying drawings:

Fig. 1 is a part sectional plan view illustrating a construction embodying the principles of my invention.

Fig. 2 is a sectional elevation of the same at the line II—II on Fig. 1.

Fig. 3 is a fragmentary section on a larger scale, showing particularly the forebay thru which the glass is conducted from the melting tank to the gathering tank.

Figs. 4, 5 and 6 illustrate a modified construction. Fig. 4 is a part sectional plan view. Fig. 5 is a section at the line V—V on Fig. 4. Fig. 6 is a section at the line VI—VI on Fig. 4.

Referring particularly to Figs. 1, 2 and 3, the furnace comprises a melting tank 10 which is rectangular in shape and provided at one end with a doghouse 11 where the raw materials are introduced. Regenerative furnaces 12 on opposite sides of the furnace may be of usual construction and supply heat for melting the batch. The furnace is shown of sufficient length to permit proper melting and refining of the glass before it reaches the discharge end of the furnace which is provided with extensions or forebays 13 thru which the glass passes to the gathering tanks or pots 14 and 15.

Each forebay 13 as shown, extends outward from the side wall of the main furnace and may form an integral part thereof. The floor 4 of this extension is preferably on the same level with the floor of the main tank. A bridge wall 16 which, as shown, is substantially flush with the side wall of the furnace, projects downward into the forebay and is positioned and shaped to provide a horizontal channel 17 and a vertical channel 18 thru which the glass flows from the main tank. It will be noted that with this construction the glass is drawn from the main tank at a point a considerable distance below the surface level and rises thru the channel 18 to substantially the level in the main tank before leaving the forebay. The glass then flows thru a comparatively shallow trough 19 into the gathering tank. An adjustable gate 20 regulates the rate of flow.

The bridge wall 16, as shown, is made hollow or provided with an interior space or passageway thru which a cooling fluid may be circulated if desired. The temperature of the glass in the tanks 14 and 15 may be regulated by recuperative or regenerative furnaces 21. The gathering tank 14 comprises a circular bowl or basin 22 to contain the molten glass. The front wall of the tank is formed with a jackarch 23 which exposes a gathering area 24 of molten glass. The glass is drawn from the gathering tank by suction molds carried on the rotating mold carriage 25 of a glass forming machine, which may be of usual construction. The molds as they pass over the gathering area 24 dip into the glass and are filled by suction. The gathering tank 15 differs from the tank 14 in that the tank 15 is of rectangular construction instead of comprising a circular basin.

It will be seen that with the above construction the temperature of the glass in its passage from the melting tank to the molds may be regulated and controlled. The temperature of the glass may be substantially reduced during its passage thru the channels 17 and 18 and the extent of this temperature reduction may be adjustably varied and controlled by varying the rate of flow, temperature and nature of the fluid being circulated thru the interior of the bridge wall 16. Removable blocks 26 are placed on the bridge wall and regulate to a certain extent the temperature of the glass, by regulating the amount of heat supplied to the surface of the glass flowing thru the forebay.

In the modified construction shown in Figs. 4 to 6, the delivery end of the melting furnace 10ª is substantially semi-circular in form and is provided with a plurality of forehearths 27 presenting gathering areas from which the molds 41 may gather their charges by suction, said molds moving in a clockwise direction along a closed path. The vertical end walls of the furnace comprise comparatively narrow sections 28 between which are interposed wall sections 29, each in the form of a hollow compartment or chamber. Each said section 29 comprises a vertical exterior or front wall 30, an interior wall 31, end walls 32 and a cover or roof 33, the latter being arched. The front wall 30 is curved inwardly or concaved to form a jackarch which exposes a gathering area between said wall and the outer convexed wall of the forehearth 27. The inner wall 31 may be curved concentrically with the wall 30, the space between said walls providing a heat regulating chamber 34. The lower end of the wall 30 is preferably spaced a short distance above the glass, and the wall 31 projects downward into the glass, thereby isolating the chamber 34 from the interior of the main tank. The wall 31 is preferably made double or in sections separated to provide a space 35 thru which air may circulate to prevent overheating and destruction of the wall.

Heat may be supplied within the chamber 34 by means of a burner comprising a nozzle 36 projecting thru an opening in the end wall 32. A stack 37 projects downward into the chamber 34 thru an opening in the roof 33 adjacent the end wall opposite the nozzle 36. A damper 38 adjustable by means of a rod 39, regulates the draft thru the flue. As indicated by the arrows on Fig. 6, the gases of combustion are directed in an approximately horizontal direction over the surface of the glass. The stack 37 is suspended by means of a bail 40 and may be adjusted up or down, thereby adjustably controlling the path of the gases or heat regulating medium. Thus a more or less localized heating or cooling medium may be regulably applied to the molten glass in proximity to the lower end of the stack where said glass enters the gathering area. The elevation of the lower end of the stack determines to a great degree the effectiveness of the applied medium. It is often desirable or necessary to cool the glass in its passage from the melting tank to the gathering area and for this purpose cooling air may be directed thru the nozzle 36. The temperature of the glass may thus be lowered during its passage from the main tank to the gathering area so that it will enter the mold 41 at the proper working temperature.

It will be seen that there are provided temperature regulating devices individual to the several chambers 34 so that the temperature of the glass supplied to each gathering machine may be controlled independently of the others. This is desirable because the working temperature required for making different sizes and kinds of ware, varies thru a considerable range. Thus, for example, in making comparatively large, heavy articles, the working temperature must be substantially lower than that required for making small ware or articles with thin walls. The present invention provides means for supplying glass at a plurality of different temperatures simultaneously to a number of machines. If desired, cooling air may be circulated thru one or more of the chambers 34 at the same time that heating flames or hot gases are circulated in other of said chambers.

Modifications may be resorted to within the spirit and scope of my invention.

I claim:

In a glass furnace the combination of a tank to contain molten glass, said tank having a lateral extension providing an exposed gathering area, a vertical wall defining the inner margin of the gathering area and having its lower edge spaced a short distance above the level of the glass, a second vertical wall spaced from the first named wall and forming therewith a chamber, said second wall projecting downwardly into the glass to completely segregate the chamber from the furnace proper, a cover connecting the upper ends of said walls, means for introducing a heat regulating medium at one end of the chamber, and a stack projecting through the cover in proximity to the other end of said chamber, said stack adapted to be adjusted vertically to change the spaced relation between its lower end and the level of the molten glass whereby to regulate the application of the heat regulating medium to the glass in proximity to the lower end of said stack.

Signed at Toledo, Ohio, this 22 day of May 1929.

LEONARD D. SOUBIER.